June 10, 1952 — H. L. ROSS — 2,600,330
FUSIBLE MEANS FOR SECURING INSTRUMENT
PARTS DURING SHIPMENT
Filed April 11, 1950

Inventor:
Herbert L. Ross,
by Russell A. Warner
His Attorney.

Patented June 10, 1952

2,600,330

UNITED STATES PATENT OFFICE 2,600,330

FUSIBLE MEANS FOR SECURING INSTRUMENT PARTS DURING SHIPMENT

Herbert L. Ross, Lynnfield, Mass., assignor to General Electric Company, a corporation of New York Application April 11, 1950, Serial No. 155,212

2 Claims. (Cl. 171—95)

My invention relates to means for securing certain parts of instruments against movement during shipment, and its object is to provide such means which can be readily removed without opening the instrument casing when the instrument is put into service.

In carrying my invention into effect, I secure the moving part or parts with fusible means such as a fine wire or vaporizable material adapted to be connected in an electric circuit so that when a small current is passed through the circuit from the outside of the instrument, such holding means is destroyed by oxidization or vaporization or is otherwise rendered incapable of its holding function without damage to the instrument on which used. In the case of many electrical instruments, the act of connecting the instrument into circuit for use may be utilized for automatically destroying the holding means.

Figure 1:
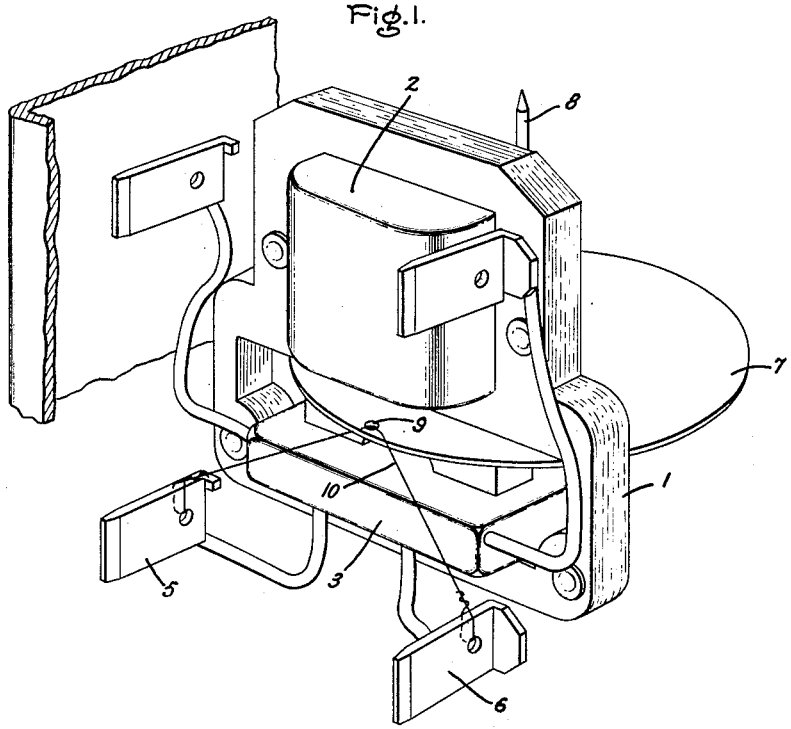
Figure 2:
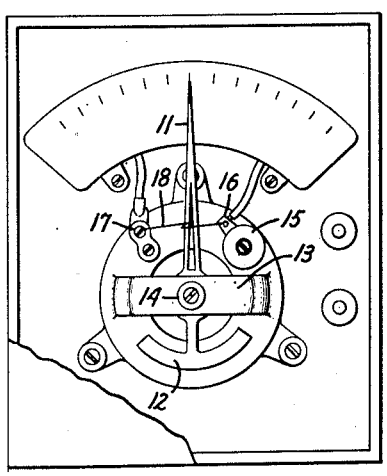

The features of my invention which are believed to be novel and patentable will be pointed out in the claims appended hereto. For a better understanding of my invention, reference is made in the following description to the accompanying drawing in which Fig. 1 illustrates the application of my invention for holding the rotary disk of an induction watthour meter stationary and in a certain position. In Fig. 2, the invention is shown for restraining the movement of the pointer of a delicate electrical measuring instrument, and in Fig. 3 the invention is shown as used for securing the escapement mechanism of a clock in a predetermined position.

During handling and shipment of many delicate measuring instruments and devices, it often becomes desirable to secure certain movable parts thereof against movement or in a definite position to prevent damage from vibration or for other reasons. When the instrument has reached its destination and is ready to be used for its intended purpose, any movable parts which have thus been secured must be released without damage to the instrument and it is often desirable that this be accomplished without opening the sealed instrument casing and by personnel unequipped with the training and tools for delicate instrument adjustment work. According to my invention, I provide holding means which will gently but firmly secure movable instrument parts against undesirable movement during shipment and the like, and which can be removed in a simple manner without injury to the instrument by unskilled persons without opening the instrument casing and without the use of tools.

In Fig. 1, I have illustrated certain portions of an induction watthour meter including the stationary magnetic circuit 1 on which is wound the voltage coil 2, and the current coil 3. The meter is equipped with electrical connections for connecting the meter in a load circuit, and two of such connections across which a voltage will exist as soon as the meter is connected in circuit may be designated by reference characters 5 and 6. The movable element of the meter comprises an induction disk 7 mounted on a shaft 8 which shaft will be rotatively mounted in bearings not shown, and which may include a bearing of the magnetic suspension type. At 9 there is represented the anticreep hole in the meter disk, which is an expedient generally found on such meters to prevent creeping of the meter disk at no-load when the voltage coil 2 only is energized. The meter, and all parts thereof represented in Fig. 1, are assumed to be housed and sealed in a meter casing, a section of which is represented, and is carefully calibrated and adjusted for accuracy under various operating conditions at the factory prior to shipment, and the meter casing sealed to keep out dust and moisture and to prevent tampering. During shipment and handling incident to shipment from the factory to the customer, it is desirable that the rotary parts be secured against rotation and vibration, and this is accomplished in accordance with my invention by passing a fine conductor wire 10 through the anticreep hole 9 and securing such wire at its ends between terminals or other electrical connections of the meter, such as the terminals 5 and 6, across which there will exist a voltage as soon as the meter is connected for use. The wire is drawn sufficiently tight to prevent movement of the meter disk but without undue strain on any part, such as guide bearings or pivots. Also, the pull of the holding wire on the meter disk is arranged to be in a direction which will cause no damage. The wire is made sufficiently small, in the nature of a fuse wire, that when the normal voltage pertaining to the device appears across its ends, it will immediately oxidize and disappear, thereby destroying itself and releasing the disk, leaving no trace or undesirable clinging fragments on or adjacent to the disk. The wire should be made from a conductor material which will not produce a vapor which would be harmful from a corrosive or other standpoint. A hairlike copper wire may be used.

It is thus seen that while the disk is securely held during shipment, it is released automatically by connecting the meter in service without opening the casing and without tools. The workman who installs the meter does not even need to know anything about such holding means. The wire heater circuit is self-interrupting both as an electric circuit and as a holding means.

In Fig. 2, there are represented portions of an electrical measuring instrument. The casing is represented with most of the cover broken away. The pointer 11 and damping vane 12 of the moving system can be seen. Thirteen (13) represents a stationary bridge structure which supports the upper jeweled bearing at 14. At 15 there is represented a resistance coil and at 16 its line connection of a circuit of the instrument. At 17 is represented another line connection of the instrument. The pointer and moving system of the instrument are secured from movement by a fine fusible wire 18 secured between the circuit points 16 and 17 and wrapped once about a section of the pointer. It will be understood that the points 16 and 17 will be circuit points across which a voltage will exist as soon as the instrument is connected in the circuit in which it is intended to be used, and that such voltage will be sufficient under normal conditions to cause immediate oxidation and destruction of the fine conductor wire 18. Thus, the instrument pointer is secured to prevent banging against its stop, and other parts of the moving system secured against damaging movement during shipment, and are automatically released when the instrument is first put into use for its intended purpose.

Figure 3:
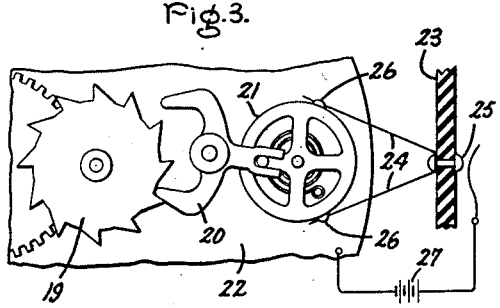

In Fig. 3 there is shown the escapement portion of a clock or other timing device, such as the escape wheel 19, the pallet 20 and balance wheel 21. At 22 there is represented a portion of one of the metallic clock plates and at 23 a portion of the wall of the clock casing assumed to be made of insulating material, such as wood. The balance wheel 21 is secured against movement in a certain position by two fine conductor wires 24 fastened between two points on the escape wheel and a metal pin 25 extending from the interior to the exterior of the casing 23 adjacent the escapement. The wires are fastened to the escape wheel 21 by small droplets 26, of a material which is a solid when cool but which vaporizes readily when heated. Naphthalene is suitable for this purpose. The droplets, as represented, are larger than is actually necessary. In case the fastening material used at 26 is not a conductor of electricity, the wires 24 will make electrical contact with the escape wheel either in the droplets or beyond so that when current is passed therethrough, the wires will be heated sufficiently to vaporize the fastening material 26. In this case, the releasing operation consists in passing a small amount of heating current through the wires to the metal escapement wheel, whereupon the material at 26 vaporizes and the wires 24 drop down against the side wall 23 out of the way.

Instead of the weight of the wires, they might be made of spring material and, when released, caused to straighten out parallel to the side wall 23, due to their own resiliency, and thus remove themselves from the vicinity of the escapement.

In order to pass the necessary heating current through the wires 24, a low voltage source of supply represented at 27 may be momentarily connected from some metallic part of the clock to the button 25. Ordinarily, metallic winding and setting shafts extend out of the rear of the clock so that by connecting the source 27 from one of such shafts to the part 25, the release may be accomplished without opening the clock casing. The metallic portions of the clock, including the balance wheel 20, serve as the remainder of the circuit.

What I claim as new and desire to secure by Letters Patent of the United States is:

1. In combination with an electrical device, an enclosing casing therefor, said device including the usual electrical connections for the normal energization and use of said device and stationary and movable parts enclosed in such casing, and holding means for restraining a movable part thereof against undesirable movement during shipment of such device, said holding means including a fine wire of conducting material secured in holding relation between such movable part and some stationary structure of such device and electrically connected between points of said electrical connections across which appreciable voltage will exist during the normal use of such device, said wire being of such character as to be immediately destroyed due to current flow therethrough when said device is put into normal use.

2. In combination with an electrical device, an enclosing casing therefor, an energizing circuit for said device leading from the exterior to the interior of said casing, said device including a movable part, and means for holding said movable part against movement prior to the time the device is put into use comprising holding means in the nature of electric fuse wire fastened to said movable part and holding the same from movement, said holding means being connected across the energizing circuit of said device within the casing so that when the device is normally energized through its external terminals such fuselike holding means will be fused and the movable part released.

HERBERT L. ROSS.

REFERENCES CITED

The following references are of record in the file of this patent:

UNITED STATES PATENTS

| Number | Name | Date |
| --- | --- | --- |
| 2,440,861 | Lamb | May 4, 1948 |